(12) United States Patent
Tartz (10) Patent No.: US 9,621,706 B2
(45) Date of Patent: Apr. 11, 2017

(54) SYSTEM AND METHOD OF HAPTIC COMMUNICATION AT A PORTABLE COMPUTING DEVICE

(75) Inventor: Robert S. Tartz, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 735 days.

(21) Appl. No.: 12/620,911

(22) Filed: Nov. 18, 2009

(65) Prior Publication Data

US 2011/0119639 A1 May 19, 2011

(51) Int. Cl.
| | |
|---|---|
| *G06F 3/01* | (2006.01) |
| *G06F 15/16* | (2006.01) |
| *H04M 1/725* | (2006.01) |
| *G06F 3/0488* | (2013.01) |
| *H04M 19/04* | (2006.01) |

(52) U.S. Cl.
CPC ........ *H04M 1/72547* (2013.01); *G06F 3/016* (2013.01); *G06F 3/017* (2013.01); *G06F 3/04883* (2013.01); *H04M 19/047* (2013.01); *H04M 2250/12* (2013.01)

(58) Field of Classification Search
USPC ....... 455/466; 345/173; 340/573.1; 341/176; 709/203
See application file for complete search history.

(56) References Cited

U.S. PATENT DOCUMENTS

| | | | | |
|---|---|---|---|---|
| 5,644,628 | A | * | 7/1997 | Schwarzer et al. ........ 379/93.19 |
| 2004/0234049 | A1 | * | 11/2004 | Melideo ..................... 379/88.17 |
| 2006/0018293 | A1 | * | 1/2006 | Farley et al. ................. 370/337 |
| 2006/0279476 | A1 | | 12/2006 | Obata |
| 2007/0125636 | A1 | | 6/2007 | Karan et al. |
| 2008/0049730 | A1 | * | 2/2008 | Iwami et al. ................. 370/352 |
| 2008/0133648 | A1 | * | 6/2008 | Grant et al. ................. 709/203 |
| 2008/0180301 | A1 | * | 7/2008 | Aaron ........................... 341/176 |
| 2008/0287147 | A1 | * | 11/2008 | Grant et al. ................. 455/466 |
| 2010/0045619 | A1 | * | 2/2010 | Birnbaum et al. ............ 345/173 |
| 2010/0188230 | A1 | * | 7/2010 | Lindsay ..................... 340/573.1 |

FOREIGN PATENT DOCUMENTS

| | | |
|---|---|---|
| CN | 101331443 A | 12/2008 |
| EP | 1936929 A1 | 6/2008 |
| JP | 2008140182 A | 6/2008 |
| JP | 2008546360 A | 12/2008 |
| JP | 2011082609 A | 4/2011 |
| TW | 200935274 A | 8/2009 |
| WO | WO2006013363 A1 | 2/2006 |
| WO | WO2008144108 A1 | 11/2008 |

OTHER PUBLICATIONS

International Preliminary Report on Patentability—PCT/US2010/056912, The International Bureau of WIPO—Geneva, Switzerland, Feb. 16, 2011.
International Search Report and Written Opinio—PCT/US2010/056912—ISA/EPO—Feb. 16, 2011.
Taiwan Search Report—TW099139818—TIPO—Aug. 16, 2013.

* cited by examiner

*Primary Examiner* — Tuan S Nguyen
(74) *Attorney, Agent, or Firm* — Nicholas A. Cole; Charles E. Eggers (57) ABSTRACT

A method of haptic communication at a wireless device is disclosed. The method may include receiving an input gesture and generating an input gesture message from the input gesture. The input gesture message may be operable for transmission to a receiving wireless device.

28 Claims, 11 Drawing Sheets

SYSTEM AND METHOD OF HAPTIC COMMUNICATION AT A PORTABLE COMPUTING DEVICE

DESCRIPTION OF THE RELATED ART

Portable computing devices (PDs) are ubiquitous. These devices may include cellular telephones, portable digital assistants (PDAs), portable game consoles, palmtop computers, and other portable electronic devices. Many portable computing devices include a haptic output interface which may interact with a user by outputting a haptic motion, e.g., a vibration. Unfortunately, communication using haptic motion is limited.

Accordingly, what is needed is an improved method of haptic communication at a portable computing device.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
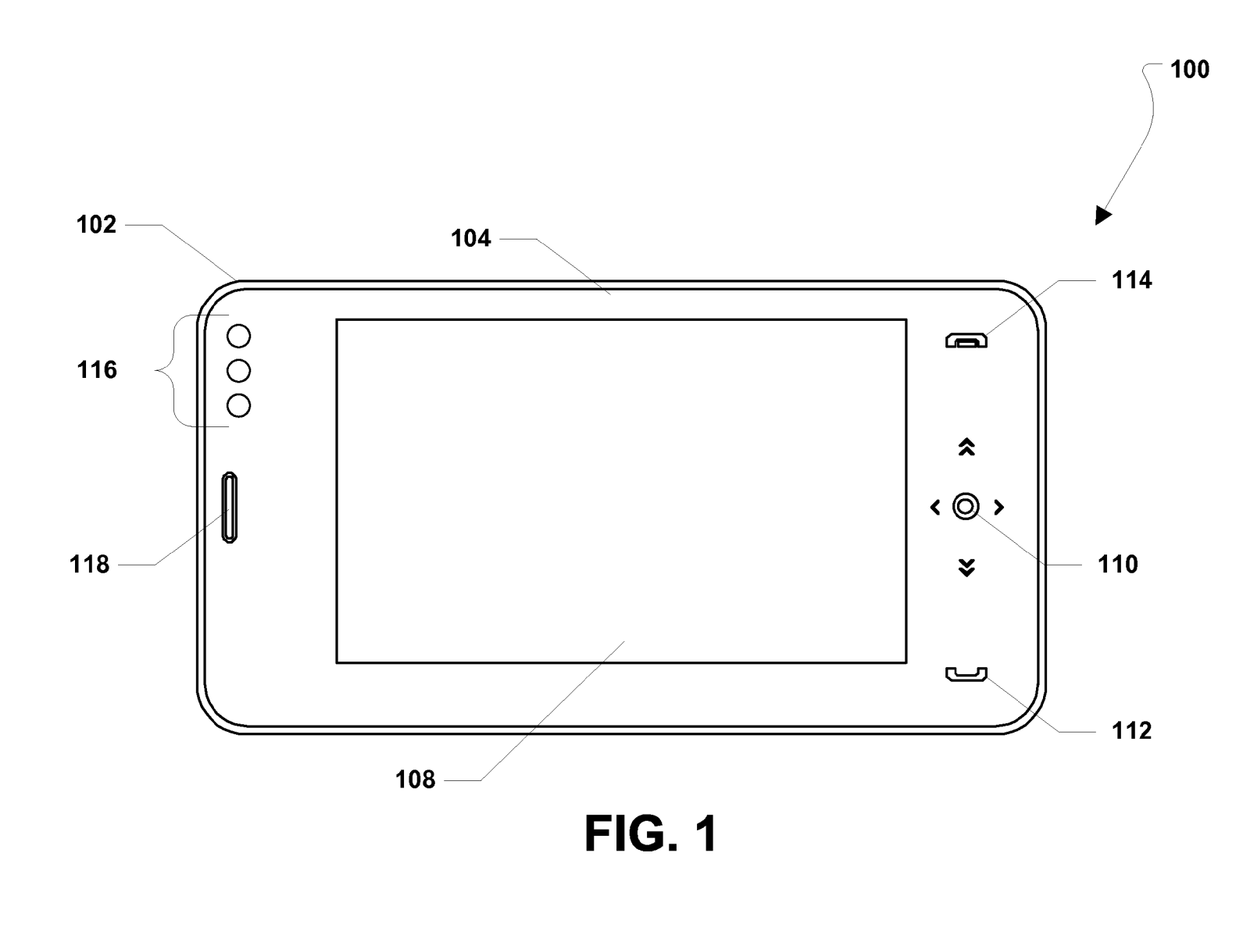
FIG. 1 is a front plan view of a portable computing device (PCD) in a closed position.
Figure 2:
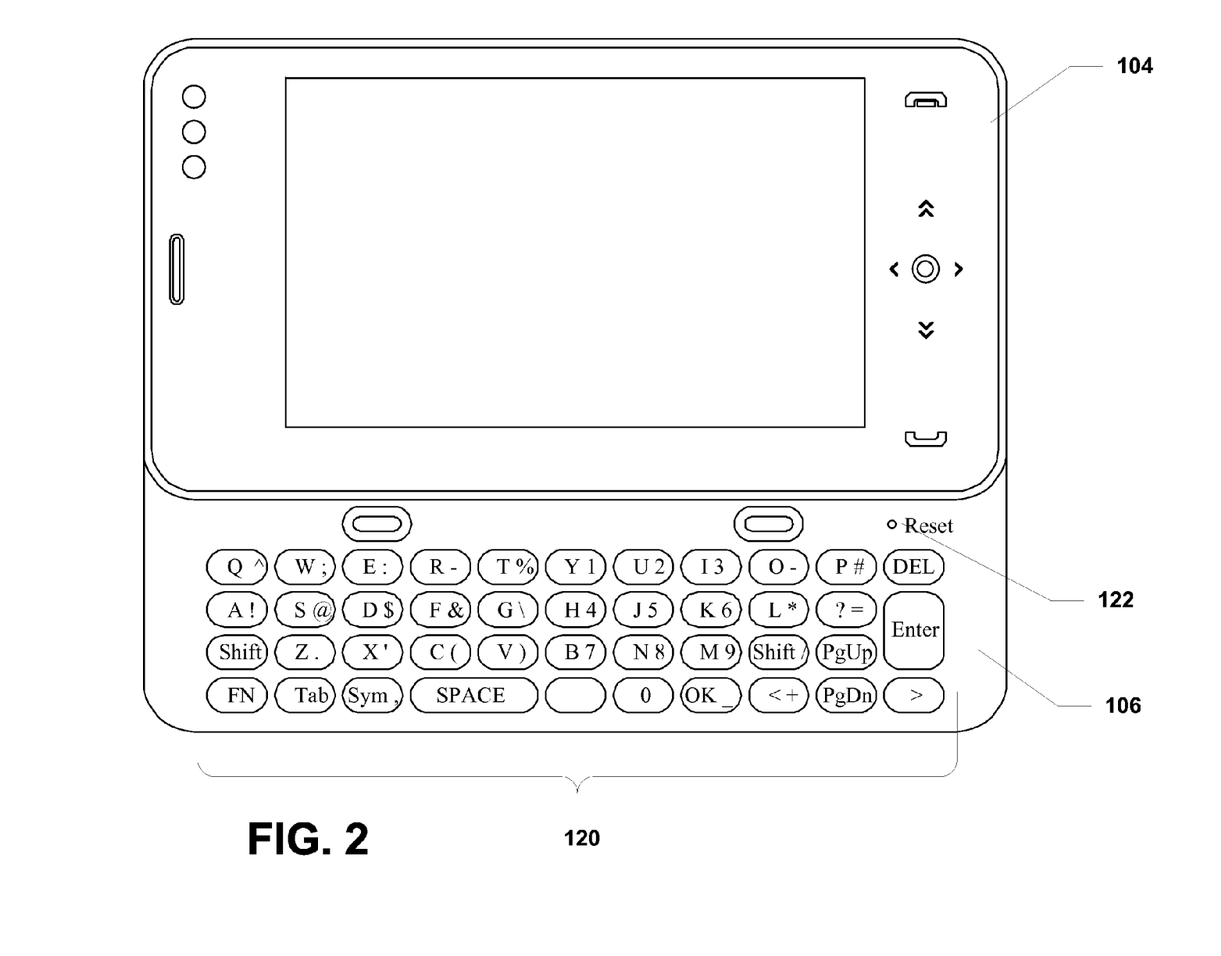
FIG. 2 is a front plan view of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
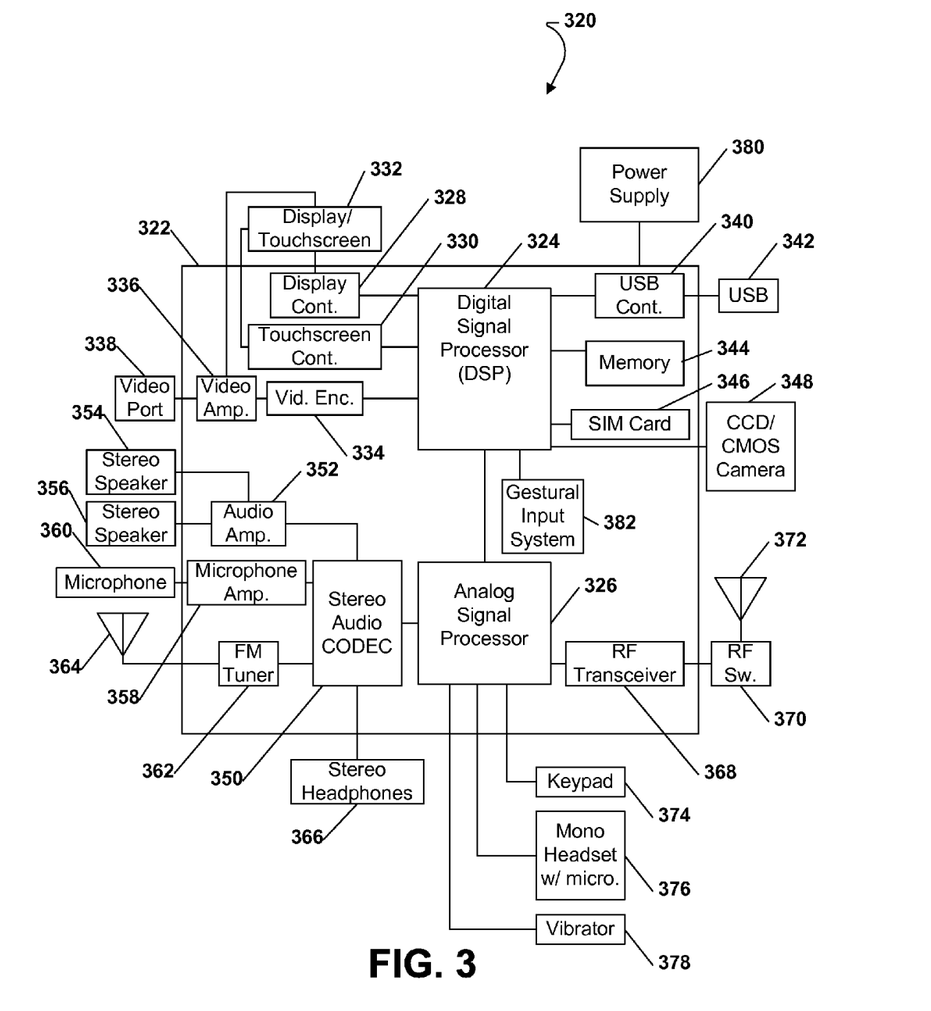
FIG. 3 is a block diagram of a PCD.

Referring to FIG. 3, an exemplary, non-limiting aspect of a portable computing device (PCD) is shown and is generally designated 320. As shown, the PCD 320 includes an on-chip system 322 that includes a digital signal processor 324 and an analog signal processor 326 that are coupled together. The on-chip system 322 may include more than two processors. For example, the on-chip system 322 may include four core processors and an ARM 11 processor, i.e., as described below in conjunction with FIG. 32.

As illustrated in FIG. 3, a display controller 328 and a touch screen controller 330 are coupled to the digital signal processor 324. In turn, a touch screen display 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television systems(s) committee (NTSC) encoder, is coupled to the digital signal processor 324. Further, a video amplifier 336 is coupled to the video encoder 334 and the touch screen display 332. Also, a video port 338 is coupled to the video amplifier 336. As depicted in FIG. 3, a universal serial bus (USB) controller 340 is coupled to the digital signal processor 324. Also, a USB port 342 is coupled to the USB controller 340. A memory 344 and a subscriber identity module (SIM) card 346 may also be coupled to the digital signal processor 324. Further, as shown in FIG. 3, a digital camera 348 may be coupled to the digital signal processor 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the analog signal processor 326. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the analog signal processor 326. An RF switch 370 may be coupled to the RF transceiver 368 and an RF antenna 372. As shown in FIG. 3, a keypad 374 may be coupled to the analog signal processor 326. Also, a mono headset with a microphone 376 may be coupled to the analog signal processor 326. Further, a vibrator device 378 may be coupled to the analog signal processor 326. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 indicates that the PCD 320 may include a gestural input system 382. The gestural input system 382 may include a gyroscope, an accelerometer, or a combination thereof. The gestural input system 382, in conjunction with a processor or controller, may serve as a means for generating input gesture messages.

Other inputs may capture gestures. For example, the camera 348 may capture an image of a gesture, e.g., a finger pointing, a foot pointing, etc. The other inputs for capturing gestures may also include a pressure sensor, a touch sensor, an inclinometer, a compass, or a combination thereof. Types of gestures may include a device-in-motion gesture, a hand gesture, a touch gesture, a squeeze gesture, or a combination thereof. Specific examples of gestures include a shake, a squeeze, a point, or a combination thereof.

As depicted in FIG. 3, the touch screen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by a processor 324, 326 in order to perform the methods described herein. Further, the processors 324, 326, the memory 344, the gestural input system 382, or a combination thereof may serve as a means for executing one or more of the method steps described herein in order to generate input gesture messages.

Figure 4:
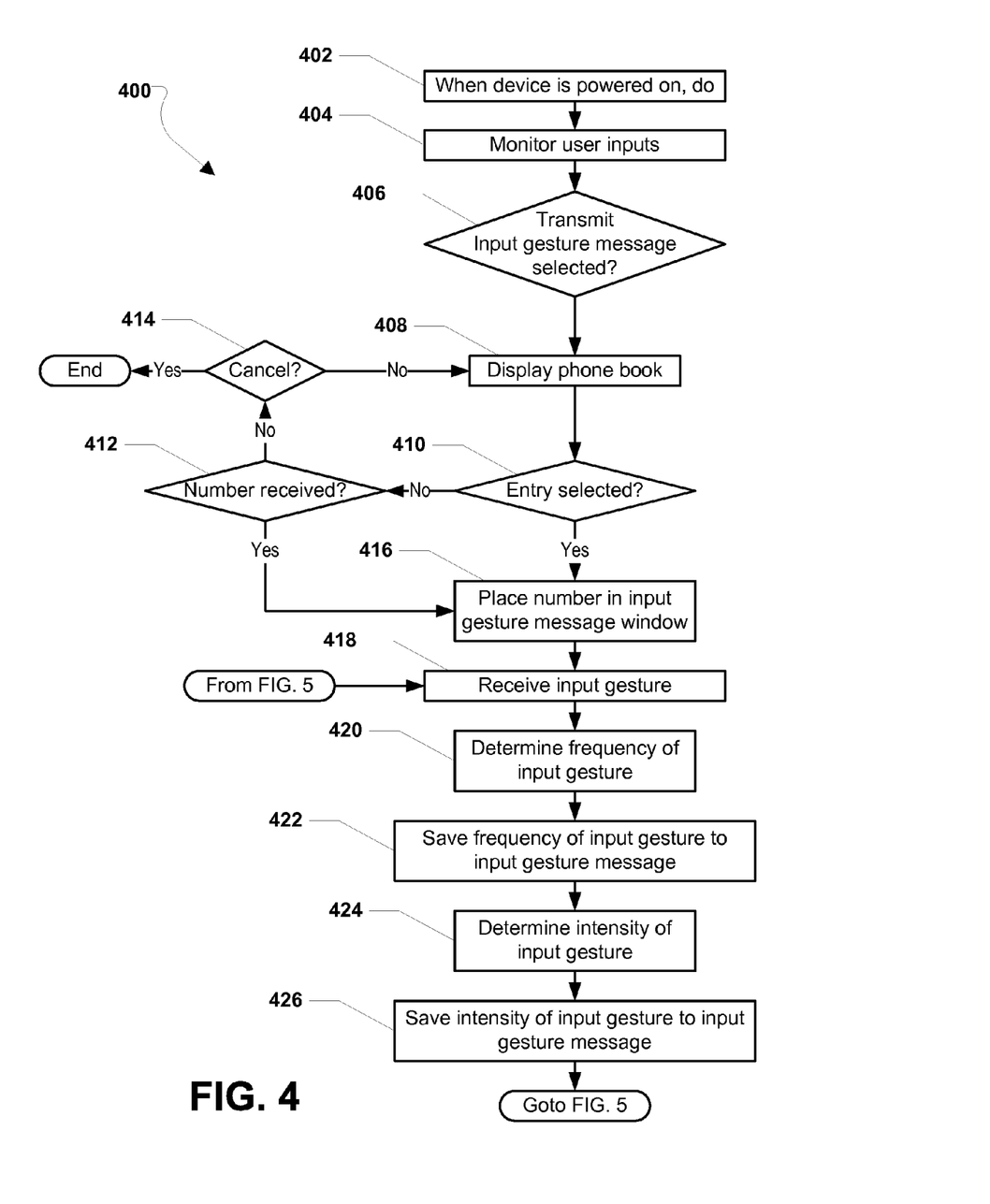
FIG. 4 is a first portion of a flowchart illustrating a first aspect of a method of generating input gesture messages at a portable communication device.
Figure 5:
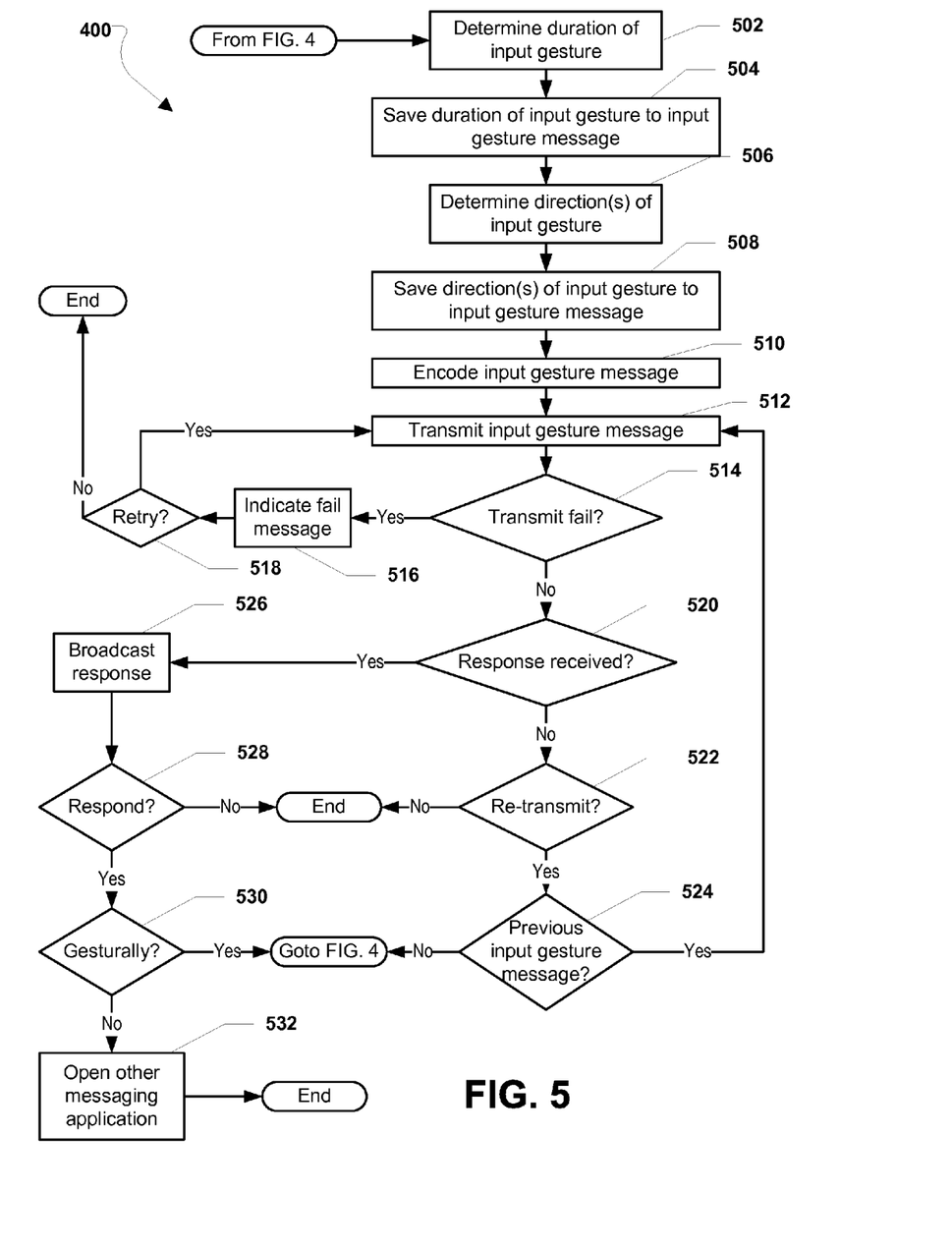
FIG. 5 is a second portion of the flowchart illustrating a first aspect of generating input gesture messages at a portable communication device.

Referring to FIG. 4 and FIG. 5, a first aspect of a method of generating input gesture messages is shown and is generally designated 400. Beginning at 402, a do loop may be entered in which when a device is powered on, the following steps may be performed. At block 404, a controller may monitor user inputs. Further, at decision 406 the controller may determine whether a user has selected a transmit haptic message option. If not, the method 400 may return to block 404 and continue as described herein. If the user has selected the transmit haptic message option, the method 400 may move to block 408 and the controller may display a phone book to the user.

Moving to decision 410, the controller may determine whether an entry from the phone book is selected. If an entry is not received, the method 400 may proceed to decision 412 and the controller may determine whether a number is received, e.g., via a manual input. If not, the method 400 may move to decision 414 and the controller may determine whether the user has canceled the selection. If so, the method 400 may end. Otherwise, the method 400 may return to block 408 and the method 400 may continue as described.

Returning to decision 410, if an entry is selected, the method 400 may proceed block 416. Further, at decision 412, if a number is received, the method 400 may also proceed to block 416. At block 416, the number may be placed in a haptic message window. Next, at block 418, an input gesture may be received. The input gesture may be received from a gestural input system. The gestural input system may include an accelerometer, a gyroscope, or a combination thereof. Further, the gestural input system may capture the input gesture and transmit details concerning the input gesture to a processor, a controller, or a combination thereof. The details concerning the input gesture may include a frequency of the input gesture, an intensity of the input gesture, a duration of the input gesture, a direction of the input gesture, or a combination thereof.

Moving to block 420, the frequency of the input gesture may be determined and at block 422, the frequency of the input gesture may be saved to an input gesture message. At block 424, the intensity of the input gesture may be determined and at block 426, the intensity of the input gesture may be saved to an input gesture message. Thereafter, the method 400 may move to block 502 of FIG. 5.

Referring now to FIG. 5, at block 502, the duration of the input gesture may be determined and at block 504, the duration of the input gesture may be saved to an input gesture message. At block 506, the direction, or directions, of the input gesture may be determined and at block 508, the direction, or directions, of the input gesture may be saved to an input gesture message.

Continuing to block 510, the input gesture message may be encoded. Further, at block 512, the encoded input gesture message may be transmitted. Moving to decision 514, the controller may determine whether the encoded input gesture message failed to transmit. If so, the method 400 may proceed to block 516 and the controller may display, or otherwise indicate, a fail message. From block 516, the method 400 may proceed to 518, and the controller may query the user to retry the transmission of the encoded input gesture message. If the user does not wish to retry the transmission, the method 400 may end. Otherwise, if the user does wish to retry the transmission, the method 400 may return to block 512 and continue as described herein.

Returning to decision 514, if the encoded input gesture did not fail to transmit, the method 400 may continue to decision 520. At decision 520, the controller may determine whether a response to the input gesture message is received. If not, the method 400 may move to decision 522 and the controller may query the user to transmit another input gesture message. If not, the method 400 may end. Otherwise, the method 400 may proceed to decision 524 and the controller may query the user to transmit the previous haptic message. If the user chooses to transmit the previous haptic message, the method 400 may return to block 512 and continue as described herein. On the other hand, if the user chooses to transmit a new haptic message, the method 400 may return to block 418 of FIG. 4 and continue as described herein.

Returning to decision 520, if a response to the input gesture message is received, the method 400 may proceed to block 526 and the controller may broadcast the response. The response may be visually transmitted to the user, audibly transmitted to the user, haptically transmitted to the user, or any combination thereof.

From block 526, the method 400 may proceed to decision 528 and the controller may query the user to respond. If the user does not choose to respond, the method 400 may end. Otherwise, if the user does choose to respond, the method 400 may move to decision 530 and the controller may query the user to respond haptically. If the user wishes to respond haptically, the method 400 may return to block 418 of FIG. 4 and continue as described herein. Conversely, if the user does not choose to respond haptically, the method 400 may move to block 532 and the controller may open another messaging application, e.g., a text messaging application. Then, the method 400 may end.

Figure 6:
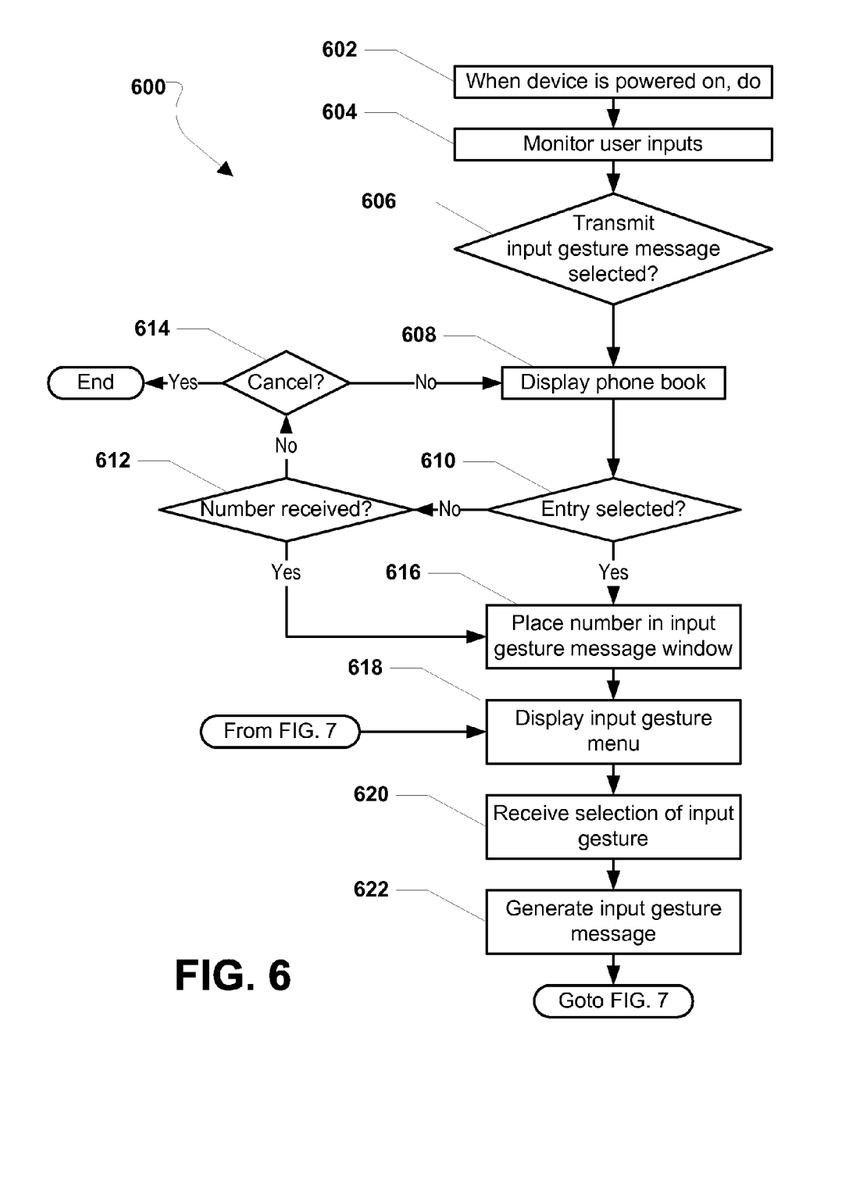
FIG. 6 is a first portion of a flowchart illustrating a second aspect of a method of generating input gesture messages at a portable communication device.
Figure 7:
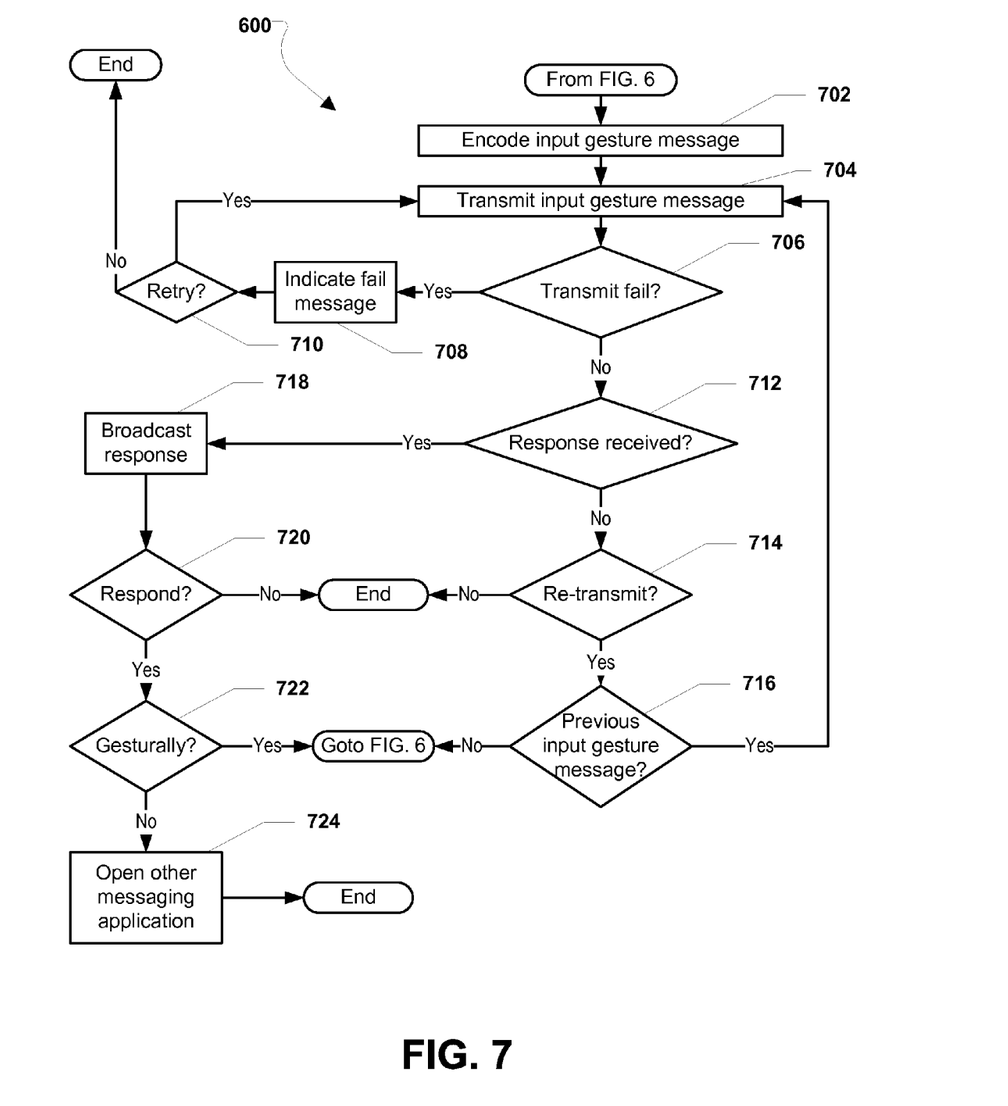
FIG. 7 is a second portion of the flowchart illustrating a second aspect of a method of generating input gesture messages at a portable communication device.

Referring to FIG. 6 and FIG. 7, a second aspect of a method of generating input gesture messages is shown and is generally designated 600. Beginning at 602, a do loop may be entered in which when a device is powered on, the following steps may be performed. At block 604, a controller may monitor user inputs. Further, at decision 606 the controller may determine whether a user has selected a transmit haptic message option. If not, the method 600 may return to block 604 and continue as described herein. If the user has selected the transmit haptic message option, the method 600 may move to block 608 and the controller may display a phone book to the user.

Moving to decision 610, the controller may determine whether an entry from the phone book is selected. If an entry is not received, the method 600 may proceed to decision 612 and the controller may determine whether a number is received, e.g., via a manual input. If not, the method 600 may move to decision 614 and the controller may determine whether the user has canceled the selection. If so, the method 600 may end. Otherwise, the method 600 may return to block 608 and the method 600 may continue as described.

Returning to decision 610, if an entry is selected, the method 600 may proceed block 616. Further, at decision 612, if a number is received, the method 600 may also proceed to block 616. At block 616, the number may be placed in a haptic message window. Next, at block 618, an input gesture menu may be displayed by the controller. At block 620, the controller may receive a selection of an input gesture. Further, at block 622, the controller may automatically generate an input gesture message based on the selection received from the user. Thereafter, the method 600 may move to block 702 of FIG. 7.

Referring now to FIG. 7, at block 702, the input gesture message may be encoded. Further, at block 704, the encoded input gesture message may be transmitted. Moving to decision 706, the controller may determine whether the encoded input gesture message failed to transmit. If so, the method 600 may proceed to block 708 and the controller may display, or otherwise indicate, a fail message. From block 708, the method 600 may proceed to 710, and the controller may query the user to retry the transmission of the encoded input gesture message. If the user does not wish to retry the transmission, the method 600 may end. Otherwise, if the user does wish to retry the transmission, the method 600 may return to block 704 and continue as described herein.

Returning to decision 706, if the encoded input gesture did not fail to transmit, the method 600 may continue to decision 712. At decision 712, the controller may determine whether a response to the input gesture message is received. If not, the method 600 may move to decision 714 and the controller may query the user to transmit another input gesture message. If not, the method 600 may end. Otherwise, the method 600 may proceed to decision 716 and the controller may query the user to transmit the previous haptic message. If the user chooses to transmit the previous haptic message, the method 600 may return to block 704 and continue as described herein. On the other hand, if the user chooses to transmit a new haptic message, the method 600 may return to block 618 of FIG. 6 and continue as described herein.

Returning to decision 712, if a response to the input gesture message is received, the method 600 may proceed to block 718 and the controller may broadcast the response. The response may be visually transmitted to the user, audibly transmitted to the user, haptically transmitted to the user, or any combination thereof.

From block 718, the method 600 may proceed to decision 720 and the controller may query the user to respond. If the user does not choose to respond, the method 600 may end. Otherwise, if the user does choose to respond, the method 600 may move to decision 722 and the controller may query the user to respond haptically. If the user wishes to respond haptically, the method 600 may return to block 618 of FIG. 6 and continue as described herein. Conversely, if the user does not choose to respond haptically, the method 600 may move to block 724 and the controller may open another messaging application, e.g., a text messaging application. Then, the method 600 may end.

Figure 8:
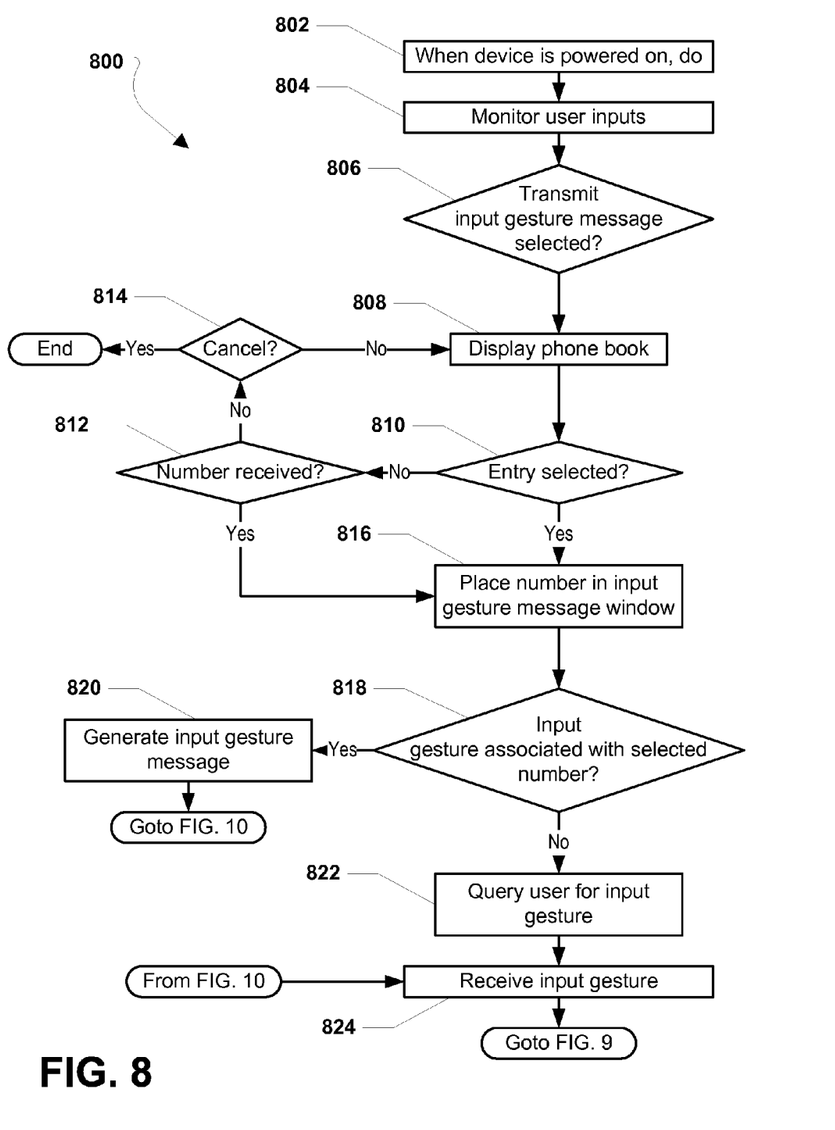
FIG. 8 is a first portion of a flowchart illustrating a third aspect of a method of generating input gesture messages at a portable communication device.
Figure 9:
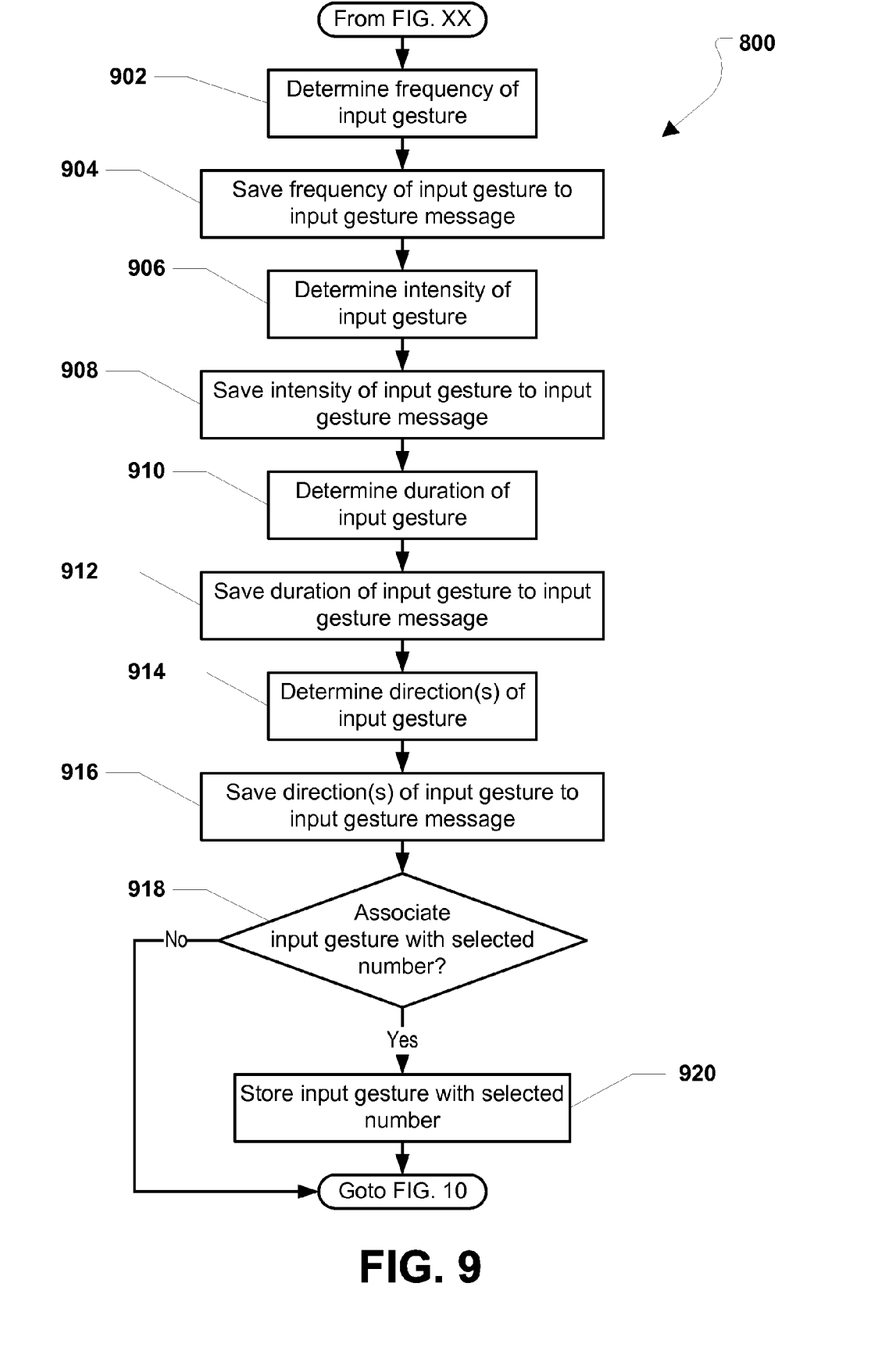
FIG. 9 is a second portion of the flowchart illustrating a third aspect of a method of generating input gesture messages at a portable communication device.
Figure 10:
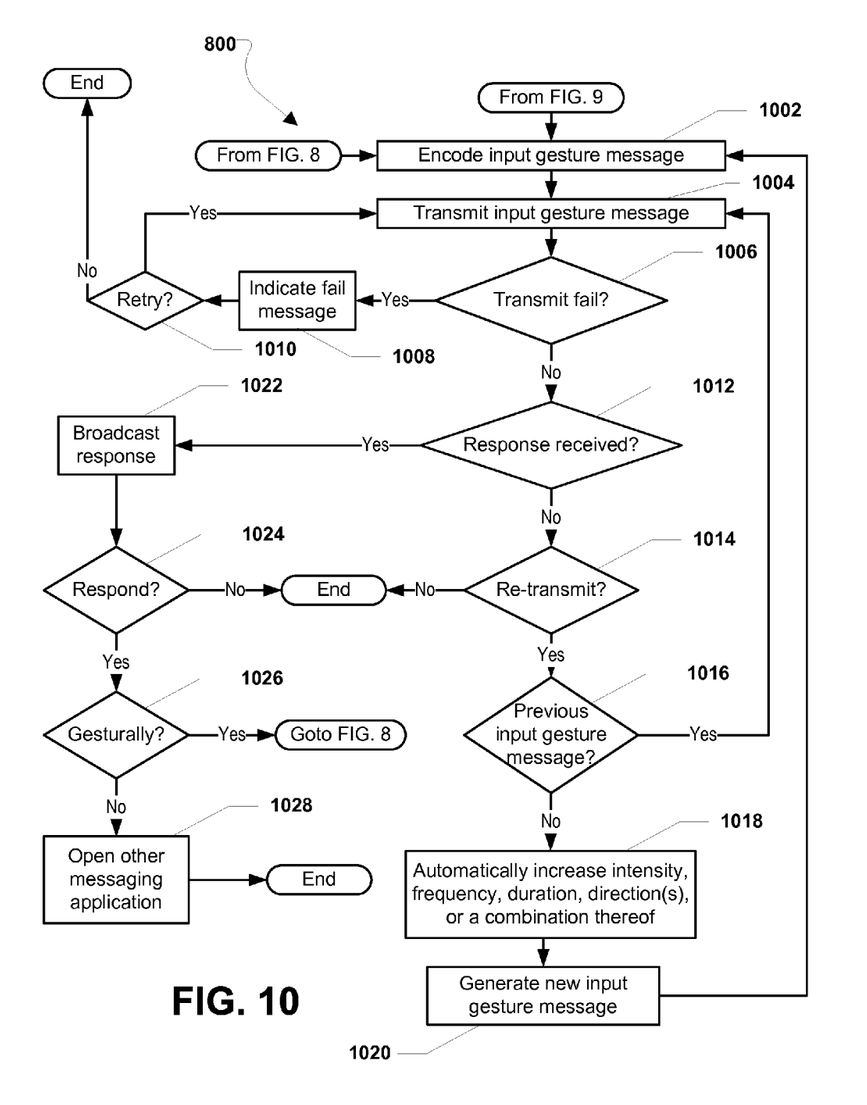
FIG. 10 is a third portion of the flowchart illustrating a third aspect of a method of generating input gesture messages at a portable communication device.

Referring to FIG. 8 through FIG. 10, a third aspect of a method of generating input gesture messages is shown and is generally designated 800. Beginning at 802, a do loop may be entered in which when a device is powered on, the following steps may be performed. At block 804, a controller may monitor user inputs. Further, at decision 806 the controller may determine whether a user has selected a transmit haptic message option. If not, the method 800 may return to block 804 and continue as described herein. If the user has selected the transmit haptic message option, the method 800 may move to block 808 and the controller may display a phone book to the user.

Moving to decision 810, the controller may determine whether an entry from the phone book is selected. If an entry is not received, the method 800 may proceed to decision 812 and the controller may determine whether a number is received, e.g., via a manual input. If not, the method 800 may move to decision 814 and the controller may determine whether the user has canceled the selection. If so, the method 800 may end. Otherwise, the method 800 may return to block 808 and the method 800 may continue as described.

Returning to decision 810, if an entry is selected, the method 800 may proceed block 816. Further, at decision 812, if a number is received, the method 800 may also proceed to block 816. At block 816, the number may be placed in a haptic message window. Next, at decision 818, the controller may determine whether there is an input gesture message associated with the number. For example, the input gesture message may have been previously generated and stored in conjunction with the number. Or, the input gesture message may have been selected from a menu of input gesture messages and stored in conjunction with the number.

If there is an input gesture message associated with the selected number, the method 800 may proceed to block 820 and the controller may generate an input gesture message. Then, the method 800 may proceed directly to block 1002 of FIG. 10. On the other hand, if there is not an input gesture message associated with the selected number, the method 800 may proceed to block 822 and the user may be queried for an input gesture message by the controller. At block 824, the controller may receive an input gesture. Thereafter, the method 800 may proceed to block 902 of FIG. 9.

Referring to FIG. 9, at block 902, the frequency of the input gesture may be determined. At block 904, the frequency of the input gesture may be saved to an input gesture message. Moving to block 906, the intensity of the input gesture may be determined and at block 908, the intensity of the input gesture may be saved to an input gesture message. At block 910, the duration of the input gesture may be determined and at block 912, the duration of the input gesture may be saved to an input gesture message. At block 914, the direction, or directions, of the input gesture may be determined and at block 916, the direction, or directions, of the input gesture may be saved to an input gesture message.

Continuing to decision 918, the controller may query the user to associate the input gesture message with the selected number. If so, the method 800 may move to block 920 and the controller may store the input gesture message in conjunction with the selected number. Thereafter, the method 800 may proceed to block 1002 of FIG. 10. Returning to decision 918, if the user does not choose to associate the input gesture message with the selected number, the method 800 may move directly to block 1002 of FIG. 10.

At block 1002 of FIG. 10, the input gesture message may be encoded. Further, at block 1004, the encoded input gesture message may be transmitted. Moving to decision 1006, the controller may determine whether the encoded input gesture message failed to transmit. If so, the method 800 may proceed to block 1008 and the controller may display, or otherwise indicate, a fail message. From block 1008, the method 800 may proceed to decision 1010, and the controller may query the user to retry the transmission of the encoded input gesture message. If the user does not wish to retry the transmission, the method 800 may end. Otherwise, if the user does wish to retry the transmission, the method 800 may return to block 1004 and continue as described herein.

Returning to decision 1006, if the encoded input gesture did not fail to transmit, the method 800 may continue to decision 1012. At decision 1012, the controller may determine whether a response to the input gesture message is received. If not, the method 800 may move to decision 1014 and the controller may query the user to transmit another input gesture message. If not, the method 800 may end. Otherwise, the method 800 may proceed to decision 1016 and the controller may query the user to transmit the previous haptic message. If the user chooses to transmit the previous haptic message, the method 800 may return to block 1004 and continue as described herein. On the other hand, if the user chooses to transmit a new haptic message, the method 800 may return to block 1018 and the controller may automatically increase the intensity of the input gesture, the frequency of the input gesture, the duration of the input gesture, the direction(s) of the input gesture, or any combination thereof. Next, at block 1020, the controller may generate a new input gesture message. The method 800 may then return to block 1002 and continue as described herein.

Returning to decision 1012, if a response to the input gesture message is received, the method 800 may proceed to block 1022 and the controller may broadcast, or transmit, the response to the user. The response may be visually transmitted to the user, audibly transmitted to the user, haptically transmitted to the user, or any combination thereof.

From block 1022, the method 800 may proceed to decision 1024 and the controller may query the user to respond. If the user does not choose to respond, the method 800 may end. Otherwise, if the user does choose to respond, the method 800 may move to decision 1026 and the controller may query the user to respond haptically. If the user wishes to respond haptically, the method 800 may return to block 824 of FIG. 8 and continue as described herein. Conversely, if the user does not choose to respond haptically, the method 800 may move to block 1028 and the controller may open another messaging application, e.g., a text messaging application. Then, the method 800 may end.

Figure 11:
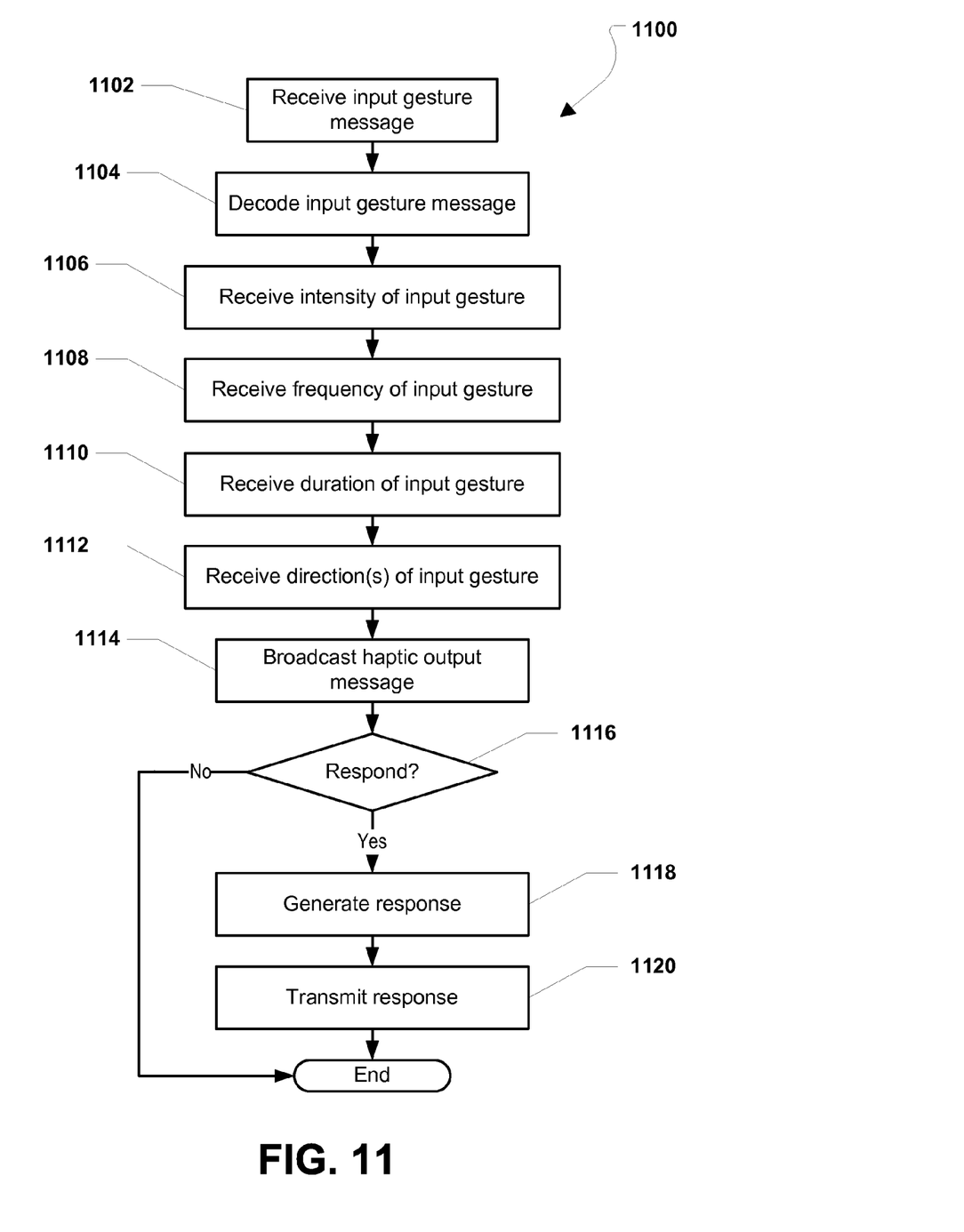
FIG. 11 is a flowchart illustrating a method of receiving input gesture messages at a portable communication device.

Referring now to FIG. 11, a method of receiving an input gesture message is shown and is generally designated 1100. Beginning at block 1102, a controller at a wireless device may receive a haptic message. At block 1104, the controller may decode an input gesture message. At block 1106, the controller may receive an intensity of the input gesture. Moreover, at block 1108, the controller may receive a frequency of the input gesture. At block 1110, the controller may receive a duration of the input gesture. Next, at block 1112, the controller may receive a direction, or directions, of the input gesture.

Moving to block 1114, the controller may haptically broadcast, transmit, or otherwise execute, a haptic output message to a user via a haptic output system. The haptic output message may be based on the input gesture captured at the sending device. For example, the haptic output message may be based on the intensity of the input gesture, the frequency of the input gesture, the duration of the input gesture, the direction(s) of the input gesture, or a combination thereof.

The haptic output system may include a variety of haptic actuators configured to provide haptic motion at the receiving device. For example, the haptic actuators may provide haptic motion, or movement, linearly along an axis, e.g., vibration along an X-Y axis. The haptic actuators may provide three dimensional motion, angular motion, or any other motion.

Returning to the description of the method 1100, at decision 1116, the controller may query the user to respond to the input gesture message. If the user does not respond, the method 1100 may end. Otherwise, if the user responds, the response may be received at block 1118. Then, at block 1120, the response may be transmitted. Thereafter, the method 1100 may end.

It is to be understood that the method steps described herein need not necessarily be performed in the order as described. Further, words such as "thereafter," "then," "next," etc. are not intended to limit the order of the steps. These words are simply used to guide the reader through the description of the method steps.

With the configuration of structure described herein, a user can generate input gesture messages and transmit the input gesture message to a receiving device. The receiving device can transmit the input gesture message to a user of the receiving device. The user of the receiving device may recognize that the input gesture message is from a particular sender, e.g., based on the frequency of the input gesture, the intensity of the input gesture, the duration of the input gesture, the direction of the input gesture or a combination thereof. An input gesture may be relatively less obtrusive to a receiving user and may provide a more subtle form of communication between users. Further, the configuration of structure described herein may be used for real-time navigation. For example, a user may monitor another user's device via a GPS system and the user may indicate which way to turn or move using an input gesture transmitted and executed as a haptic output. The configuration of structure, e.g., the system(s), method(s), or combinations thereof, described herein may also be used for real-time communication, e.g., during a telephone call, a chat session, an instant messaging (IM) session, a text messaging session, or a combination thereof. As such, a user may supplement a conversation, chat session, etc., by transmitting, in real-time, one or more input gestures.

It may be appreciated that an input gesture may be captured at the sending device, converted to an input gesture message, and encoded. The input gesture message may be transmitted to a receiving device, decoded, and a haptic output message may be created from the input gesture message. The haptic output message may be executed to the user via one or more haptic actuators. The haptic output message output at the receiving device may closely replicate the input gesture captured at the sending, or transmitting, device. As such, it may be appreciated that an input gesture at a sending device may be translated into a haptic output message at a receiving device.

In one or more exemplary aspects, the functions described may be implemented in hardware, software, firmware, or any combination thereof. If implemented in software, the functions may be stored on or transmitted over as one or more instructions or code on a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of haptic communication at a wireless device, the method comprising:
   receiving an input gesture from a user;
   determining an intensity of the input gesture, a frequency of the input gesture, a duration of the input gesture, a direction of the input gesture, or a combination thereof;
   saving the intensity of the input gesture, the frequency of the input gesture, the duration of the input gesture, the direction of the input gesture, or the combination thereof;
   associating the input gesture with a telephone number stored in a phone book at the wireless device;
   generating an input gesture message from the input gesture based on the association, wherein the input gesture message is operable for transmission to a receiving wireless device having the telephone number and configured to produce a haptic output at the receiving wireless device based on the input gesture;
   transmitting the input gesture message to the receiving wireless device;
   determining whether a response to the input gesture message is received from the receiving wireless device;
   automatically increasing the intensity of the input gesture, the frequency of the input gesture, the duration of the input gesture, the direction of the input gesture, or the combination thereof if no response to the input gesture message has been received from the receiving wireless device;
   querying the user whether to transmit a second input gesture message based upon a determination that no response to the input gesture message has been received from the receiving wireless device;
   generating the second input gesture message based upon a decision by the user to transmit the second input gesture message and based on the automatic increase of the intensity of the input gesture, the frequency of the input gesture, the duration of the input gesture, the direction of the input gesture, or the combination thereof, wherein the second input gesture message is operable for transmission to the receiving wireless device; and
   transmitting the second input gesture message to the receiving wireless device.

2. The method of claim 1, further comprising:
   encoding the input gesture message;
   wherein the transmission of the input gesture message comprises transmitting the encoded input gesture message to the receiving wireless device.

3. The method of claim 1, wherein the input gesture is captured using a gestural input system within the wireless device.

4. The method of claim 3, wherein the gestural input system comprises a gyroscope, an accelerometer, a camera, a pressure sensor, a touch sensor, an inclinometer, a compass, or a combination thereof.

5. The method of claim 1, wherein:
the automatic increase in the intensity of the input gesture, the frequency of the input gesture, the duration of the input gesture, the direction of the input gesture, or the combination thereof is based upon the decision of the user to transmit the second input gesture message.

6. The method of claim 1, wherein the generating the second input gesture message comprises:
requesting a permission to retransmit the input gesture message;
receiving a second input gesture when the permission to retransmit the input gesture message is denied; and
generating the second input gesture message based on the second input gesture.

7. The method of claim 1, wherein the generation of the input gesture message comprises:
determining whether a previously generated input gesture message is stored in conjunction with the telephone number.

8. A portable computing device, comprising:
a processor, wherein the processor performs operations to:
receive an input gesture from a user,
determine an intensity of the input gesture, a frequency of the input gesture, a duration of the input gesture, a direction of the input gesture, or a combination thereof,
save the intensity of the input gesture, the frequency of the input gesture, the duration of the input gesture, the direction of the input gesture, or the combination thereof,
associate the input gesture with a telephone number stored in a phone book at the wireless device, and
generate an input gesture message from the input gesture based on the association, wherein the input gesture message is operable for transmission to a receiving wireless device having the telephone number and configured to produce a haptic output at the receiving wireless device based on the input gesture; and
a transceiver, wherein the transceiver is operable to transmit the input gesture message to the receiving wireless device,
determine whether a response to the input gesture message is received from the receiving wireless device,
automatically increase the intensity of the input gesture, the frequency of the input gesture, the duration of the input gesture, the direction of the input gesture, or the combination thereof to generate the second input gesture message if the user chooses to transmit the second input gesture message,
query the user whether to transmit a second input gesture message based upon a determination that that no response to the input gesture message has been received from the receiving wireless device, and
generate the second input gesture message based upon a decision by the user to transmit the second input gesture message and based on the automatic increase of the intensity of the input gesture, the frequency of the input gesture, the duration of the input gesture, the direction of the input gesture, or the combination thereof, wherein the second input gesture message is operable for transmission to the receiving wireless device, and
transmit the second input gesture message to the receiving wireless device.

9. The device of claim 8, wherein the processor further operates to:
encode the input gesture message; and
transmit the encoded input gesture message to the receiving wireless device.

10. The device of claim 8, wherein the input gesture is captured using a gestural input system within the wireless device.

11. The device of claim 10, wherein the gestural input system comprises a gyroscope, an accelerometer, a camera, a pressure sensor, a touch sensor, an inclinometer, a compass, or a combination thereof.

12. The device of claim 8, wherein:
the automatic increase in the intensity of the input gesture, the frequency of the input gesture, the duration of the input gesture, the direction of the input gesture, or the combination thereof is based upon the decision of the user to transmit the second input gesture message.

13. The portable computing device of claim 8, wherein the processor further operates to:
request a permission to retransmit the input gesture message;
receive a second input gesture when the permission to retransmit the input gesture message is denied; and
generate the second input gesture message based on the second input gesture.

14. The portable computing device of claim 8, wherein the generation of the input gesture message comprises:
determining whether a previously generated input gesture message is stored in conjunction with the telephone number.

15. A portable computing device, comprising a processor, the processor comprising:
means for receiving an input gesture from a user;
means for determining an intensity of the input gesture, a frequency of the input gesture, a duration of the input gesture, a direction of the input gesture, or a combination thereof;
means for saving the intensity of the input gesture, the frequency of the input gesture, the duration of the input gesture, the direction of the input gesture, or the combination thereof;
means for associating the input gesture with a telephone number stored in a phone book at the wireless device;
means for generating an input gesture message from the input gesture based on the association, wherein the input gesture message is operable for transmission to a receiving wireless device having the telephone number and configured to produce a haptic output at the receiving wireless device based on the input gesture;
means for transmitting the input gesture message to the receiving wireless device;
means for determining whether a response to the input gesture message is received from the receiving wireless device;
means for automatically increasing the intensity of the input gesture, the frequency of the input gesture, the duration of the input gesture, the direction of the input gesture, or the combination thereof for the second input gesture message if no response to the input gesture message has been received from the receiving wireless device,
means for querying the user whether to transmit a second input gesture message based upon a determination that no response to the input gesture message has been received from the receiving wireless device; and wherein the means for generating is configured to generate the second input gesture message based upon a decision by the user to transmit the second input gesture message and based on the automatic increase of the intensity of the input gesture, the frequency of the input gesture, the duration of the input gesture, the direction of the input gesture, or the combination thereof, and the second input gesture message is operable for transmission to the receiving wireless device; and the means for transmitting is configured to transmit the second input gesture message to the receiving wireless device.

16. The device of claim 15, further comprising:
means for encoding the input gesture message;
wherein the means for transmitting is configured to transmit the encoded input gesture message to the receiving wireless device.

17. The device of claim 15, wherein the input gesture is captured using a gestural input system within the wireless device.

18. The device of claim 17, wherein the gestural input system comprises a gyroscope, an accelerometer, a camera, a pressure sensor, a touch sensor, an inclinometer, a compass, or a combination thereof.

19. The device of claim 15, wherein:
the automatic increase in the intensity of the input gesture, the frequency of the input gesture, the duration of the input gesture, the direction of the input gesture, or the combination thereof is based upon the decision of the user to transmit the second input gesture message.

20. The portable computing device of claim 15, wherein the means for generating the second input gesture message comprises:
means for requesting a permission to retransmit the input gesture message;
means for receiving a second input gesture when the permission to retransmit the input gesture message is denied; and
means for generating the second input gesture message based on the second input gesture.

21. The portable computing device of claim 15, wherein the generation of the input gesture message comprises:
determining whether a previously generated input gesture message is stored in conjunction with the telephone number.

22. A non-transitory machine readable medium, comprising:
at least one instruction for receiving an input gesture from a user;
at least one instruction for determining an intensity of the input gesture, a frequency of the input gesture, a duration of the input gesture, a direction of the input gesture, or a combination thereof;
at least one instruction for saving the intensity of the input gesture, the frequency of the input gesture, the duration of the input gesture, the direction of the input gesture, or the combination thereof;
at least one instruction for associating the input gesture with a telephone number stored in a phone book at the wireless device;
at least one instruction for generating an input gesture message from the input gesture based on the association, wherein the input gesture message is operable for transmission to a receiving wireless device having the telephone number and configured to produce a haptic output at the receiving wireless device based on the input gesture;
at least one instruction for transmitting the input gesture message to the receiving wireless device;
at least one instruction for determining whether a response to the input gesture message is received from the receiving wireless device;
at least one instruction for automatically increasing the intensity of the input gesture, the frequency of the input gesture, the duration of the input gesture, the direction of the input gesture, or the combination thereof for the second input gesture message if no response to the input gesture message has been received from the receiving wireless device;
at least one instruction for querying the user whether to transmit a second input gesture message based upon a determination that no response to the input gesture message has been received from the receiving wireless device;
at least one instruction for generating the second input gesture message based upon a decision by the user to transmit the second input gesture message and based on the automatic increase of the intensity of the input gesture, the frequency of the input gesture, the duration of the input gesture, the direction of the input gesture, or the combination thereof, wherein the second input gesture message is operable for transmission to the receiving wireless device; and
at least one instruction for transmitting the second input gesture message to the receiving wireless device.

23. The non-transitory machine readable medium of claim 22, further comprising:
at least one instruction for encoding the input gesture message; and
at least one instruction for transmitting the encoded input gesture message to the receiving wireless device.

24. The non-transitory machine readable medium of claim 22, wherein the input gesture is captured using a gestural input system within the wireless device.

25. The non-transitory machine readable medium of claim 24, wherein the gestural input system comprises a gyroscope, an accelerometer, a camera, a pressure sensor, a touch sensor, an inclinometer, a compass, or a combination thereof.

26. The non-transitory machine readable medium of claim 22, wherein:
the automatic increase in the intensity of the input gesture, the frequency of the input gesture, the duration of the input gesture, the direction of the input gesture, or the combination thereof is based upon the decision of the user to transmit the second input gesture message.

27. The non-transitory machine readable medium of claim 22, wherein the at least one instruction for generating the second input gesture message comprises:
at least one instruction for requesting a permission to retransmit the input gesture message;
at least one instruction for receiving a second input gesture when the permission to retransmit the input gesture message is denied; and
at least one instruction for generating the second input gesture message based on the second input gesture.

28. The non-transitory machine readable medium of claim 22, wherein the generation of the input gesture message comprises:
   determining whether a previously generated input gesture message is stored in conjunction with the telephone number.

\* \* \* \* \*